United States Patent
Rosynsky et al.

[11] Patent Number: 5,953,832
[45] Date of Patent: Sep. 21, 1999

[54] METHOD FOR DRYING A COATED SUBSTRATE

[75] Inventors: Victor Rosynsky, Ewing, N.J.; Paul J. Takacs, Hudson, Ohio

[73] Assignee: Engelhard Corporation, Iselin, N.J.

[21] Appl. No.: 09/067,831

[22] Filed: Apr. 28, 1998

[51] Int. Cl.[6] .................................................. F26B 5/04
[52] U.S. Cl. .............................. 34/403; 34/408; 34/412; 34/92
[58] Field of Search .................. 34/402, 403, 406, 34/408, 412, 92, 202, 210, 213, 218; 118/50, 50.1, 63; 427/294, 295, 297, 353

[56] References Cited

U.S. PATENT DOCUMENTS

| | | |
|---|---|---|
| 4,191,126 | 3/1980 | Reed et al. . |
| 4,384,014 | 5/1983 | Young . |
| 4,550,034 | 10/1985 | Shimrock et al. .................. 427/294 X |
| 4,609,563 | 9/1986 | Shimrock et al. . |
| 5,514,421 | 5/1996 | Pietrzykowski et al. ............ 427/430.1 |
| 5,667,928 | 9/1997 | Thomas et al. .................. 427/430.1 X |
| 5,866,210 | 2/1999 | Rosynsky et al. ...................... 427/294 |

*Primary Examiner*—Henry Bennett
*Assistant Examiner*—Steve Gravini

[57] ABSTRACT

A method of drying a coated monolithic substrate by imposing a vacuum at one end of the substrate to draw volatilized constituents out of the channels and by delivering a gas stream through the other end of the substrate during the drying process.

6 Claims, 1 Drawing Sheet

METHOD FOR DRYING A COATED SUBSTRATE

FIELD OF THE INVENTION

The present invention is generally directed to a method of coating a substrate having a plurality of channels such as a monolithic substrate used in catalytic converters. In particular, the present invention provides for the rapid and uniform coating of the monolithic substrate with a slurry of a coating media and the rapid drying of the same. During the coating process, moisture is retained within the channels of the monolithic substrate. Removal of the moisture is necessary to dry and secure the coating. In accordance with the present invention, moisture and other volatiles are removed by the imposition of a vacuum in a manner and for a time sufficient to remove the moisture and other volatiles while maintaining a desired coating profile within the channels.

BACKGROUND OF THE INVENTION

Catalytic converters are well known for the removal and/or conversion of the harmful components of exhaust gases. While catalytic converters have a variety of constructions for this purpose, one form of construction is a catalytically coated rigid skeletal monolithic substrate, or honeycomb-type element which has a multiplicity of longitudinal channels to provide a catalytically coated body having a high surface area. The rigid, monolithic substrate is fabricated from ceramics and other materials. Such materials and their construction are described, for example, in U.S. Pat. Nos. 3,331,787 and 3,565,830 each of which is incorporated herein by reference.

The monolithic substrate and particularly the multiplicity of channels are coated with a slurry of a catalytic and/or absorbent material (hereinafter referred to collectively as a "coating media"). The slurry contains water and possibly other liquid constituents which upon heating are vaporized. While various methods are known in the art for coating a monolithic substrate with a coating media, such methods from the standpoint of cost are deficient in minimizing the amount of coating media applied, especially when a costly catalytically active precious metal such as platinum, palladium or rhodium is deposited as part of the coating media. Not only is it difficult to coat monolithic substrates, it is also difficult to provide a consistent and reproducible coating pattern within the channels.

One method of coating a prefabricated monolithic substrate is to pump the coating media into the respective channels and then subject the coated substrate to a drying operation. Drying is a necessary step in the coating process so as to remove vaporized constituents (e.g. water vapor) and rapidly fix the coating media in the channels. Systems which employ a drying operation have been unsuccessful in providing a uniform coating thickness and a uniform coating profile wherein the coating media is deposited uniformly over the same length of each of the channels.

It has been proposed to employ a vacuum to draw the coating media upwardly through the channels. For example, Peter D. Young, U.S. Pat. No. 4,384,014 discloses the imposition of a vacuum over the monolithic substrate to remove air from the channels while drawing the coating media upwardly through the channels. The vacuum is then broken and excess coating media is removed, preferably by gravity drainage i.e. excess coating media travels downwardly out of the lower or rearward end of the channels.

James R. Reed et al., U.S. Pat. No. 4,191,126 disclose the dipping of the monolithic substrate in a coating media and utilizing subatmospheric pressure to purge the excess coating media from the surfaces of the support. The applied vacuum is intended to unplug the channels so that the coating media is drawn over the surfaces of each of the channels.

An improvement in these systems is disclosed in Thomas Shimrock et al., U.S. Pat. No. 4,609,563, incorporated herein by reference. This system encompasses a method of vacuum coating ceramic substrate members with coating media wherein predetermined amounts of coating media are metered for application to the ceramic monolithic substrate. The monolithic substrate is lowered into a vessel of preferably predetermined dimensions to a predetermined depth containing the precise amount of coating media which is to be coated onto the substrate. The coating media is then drawn up by a vacuum which is applied to the end of the substrate opposite to the end which is immersed in the coating media bath. No draining or purging of excess coating media from the substrate is necessary nor is any pre-vacuum application step required to eliminate air.

In Shimrock et al., the design of the vessel (also known as a dip pan) containing the precise amount of coating media is desirably shaped to freely receive but closely conform to the substrate to the substrate to be coated. As exemplified is U.S. Pat. No. 4,609,563, if the monolithic substrate is in the shape of an oval, the dip pan is also in the shape of an oval with slightly larger dimensions than the substrate itself.

While the '563 patent process provides a smooth coating exceeding that of the other reference processes, nonetheless, there is still difficulty in obtaining a uniform coating profile wherein the coating media covers the same length of each channel. In addition, because the '563 patent process prefers precisely shaped and dimensioned dip pans for each type of monolithic substrate, added expense is incurred by having to inventory a variety of different sized and shaped dip pans. Still further, the dimensions of each dip pan is preferably only slightly larger than the substrate. Therefore extra care must be taken by operating personnel to place the fragile substrate in the dip pan so that the substrate does not accidently hit the dip pan and be damaged thereby.

An improved vacuum infusion coating method is disclosed in U.S. patent application Ser. No. 08/668,385 filed Jun. 21, 1996 (Attorney Docket No.3983) which seeks to provide a uniform coating profile by applying a vacuum to a substrate partially immersed in a coating media at an intensity and for a time sufficient to draw the coating media uniformly upwardly into the channels of the monolithic substrate. Substrates coated in this manner, while uniformly coated, are difficult to dry. This is because some of the constituents of the coating media vaporize under the coating conditions and a vapor layer forms within the channels. The presence of a vapor layer impedes drying of the coating media and can delay further processing of the coated substrate. Efforts at hastening the drying process by increasing the intensity of the vacuum during vacuum infusion of the coating media can draw the coating media further into the channels than is desired and can result in a non-uniform coating profile.

It would therefore be a significant advance in the art of coating monolithic substrates and particularly monolithic substrates for use in catalytic converters if the drying of the substrate could be hastened while maintaining a uniform coating profile within the channels of the substrate.

SUMMARY OF THE INVENTION

The present invention is generally directed to a method for drying the channels of monolithic substrates which have been coated with a coating media. The method provides for drying in a rapid manner while maintaining the coating profile provided by the coating process, preferably a uniform coating profile. The term "uniform coating profile" as used herein means that each channel of the substrate will be coated over approximately the same length, typically less than the entire length of the substrate.

The method of the present invention relies on both the "pulling" off of vapors by the imposition of a vacuum (i.e. by suction) and the "pushing" of a stream of gas (preferably at an elevated temperature) through the substrate.

In accordance with the push-pull method of the present invention the substrate, after application of the coating media, is rapidly and thoroughly dried to prevent movement of the coating media within the channels and to affix the coating media to the walls of the channels without adversely affecting the coating profile. As a consequence, the coated substrate can be further processed in a cost efficient and effective manner.

In particular, the present invention is directed to a method of drying a monolithic substrate having a coating media within a plurality of channels comprising:

(a) removing a first end of the coated monolithic substrate from a bath containing the coating media while the coating media is in a wet condition; and (b) applying a vacuum to an opposed end of the coated monolithic substrate at an intensity and a time sufficient to draw vapor out of said channels while forcing a gas stream through the substrate from the first end in the direction of said opposed end without substantially changing the coating profile within the channels.

In a preferred form of the invention, the gas stream, preferably air, is at an elevated temperature to facilitate the drying operation.

BRIEF DESCRIPTION OF THE DRAWINGS

The following drawings in which like reference like characters indicate like parts are illustrative of embodiments of the invention and are not intended to limit the invention as encompassed by the claims forming part of the application.

DETAILED DESCRIPTION OF THE INVENTION

Figure 1:
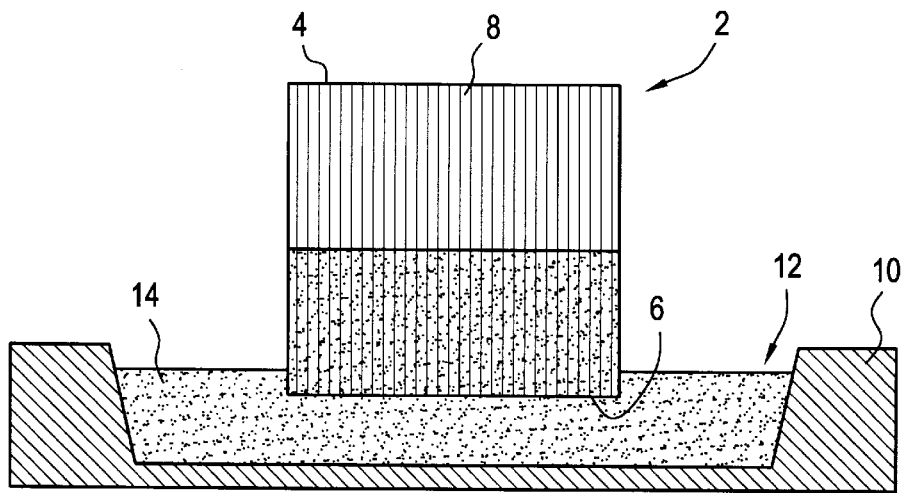
FIG. 1 is a side elevational view of a monolithic substrate partially immersed in a vessel containing a coating media with the channels being partially coated with the coating media.

The present invention is directed to a method of coating a substrate having a plurality of channels in which the coating media is dried by a process which ensures rapid drying without disrupting the coating profile. The method of the present invention combines the drawing out or pulling of vaporized materials from the substrate by the imposition of a vacuum in conjunction with the driving or pushing of a gas stream through the substrate.

The coating of a monolithic substrate can be performed by several different methods including dipping, spraying and vacuum infusion as disclosed in U.S. Pat. No. 4,609,563 and pending U.S. application Ser. No. 08/668,385 filed on Jun. 21, 1996, each of which is incorporated herein by reference.

In general, a preformed monolithic substrate, which can be made of ceramic or metals or other suitable material is coated with a coating media such as a catalytic composition, an absorbent composition or both. The coating media is typically in the form of a slurry containing constituents (e.g. water) which vaporize during the coating operation. The slurry can be applied to the monolithic substrate by, for example, dipping, spraying or by imposing a vacuum on one end of the substrate to thereby draw the coating media upwardly from a vessel.

Referring to FIG. 1, there is shown a monolithic substrate 2 having a top end 4 and a bottom end 6. The substrate 2 includes a plurality of channels 8, the interior of which is to be coated with a coating media such as a catalytic composition, an absorbent composition or both. As shown in FIG. 1, the substrate 2 may be immersed in a vessel 10 such as a dip pan having a region 12 in the form of a reservoir containing a coating media 14.

In a vacuum infusion coating method, a vacuum is applied to the top end 4 of the substrate 2 to create a pressure drop to thereby draw the coating media 14 upwardly from the reservoir 12 into the bottom end 6 of the substrate 2 so as to coat the channels 8 at least over a portion of their length. Once the coating media is drawn upwardly into the channels, volatile constituents including water vapor are present in the channel. Vaporization occurs because the temperature within the channels exceeds the vaporization temperature of at least some of the constituents of the coating media. As a result a vapor layer forms within the channels.

The presence of a vapor layer contributes to the plugging of the channels which thereby limits the efficiency of drying and may adversely affect the coating profile initially applied by the coating operation.

More specifically, the presence of vapors within the channels causes a vapor layer to form when typically closes or plugs the pathway defined by the channel. Thus, the exposure of the still wet coating media to the atmosphere is reduced thereby extending the time it takes for the coating media to dry. The longer the drying time, the greater the risk that the still wet coating media will move downwardly due to the force of gravity. The result can be an uneven coating in the channels of the monolithic substrate.

Conventional drying of coated substrates employs evaporation alone or evaporation in conjunction with the blowing of hot air from the bottom end of the substrate through the top end. The blowing of hot air imposes pressure on the vapor and causes the same to rise out of the channels. However, the amount of water vapor present in the channels and the pressure gradient made thereby can require a significant force to blow the vapor out of the channels. The use of excessive force can have an adverse impact on the coating media and particularly the coating profile. In particular, the blowing of excessive hot air through the channels to remove the vapor can cause the coating media to also rise within the channels and thereby change the coating profile.

In accordance with the present invention, the vapor contained within the channels after the coating media has been applied is drawn out of the channels through the imposition of a vacuum applied at the top end of the substrate alone or in combination with hot air being blown into the bottom end of the substrate.

Figure 2A:
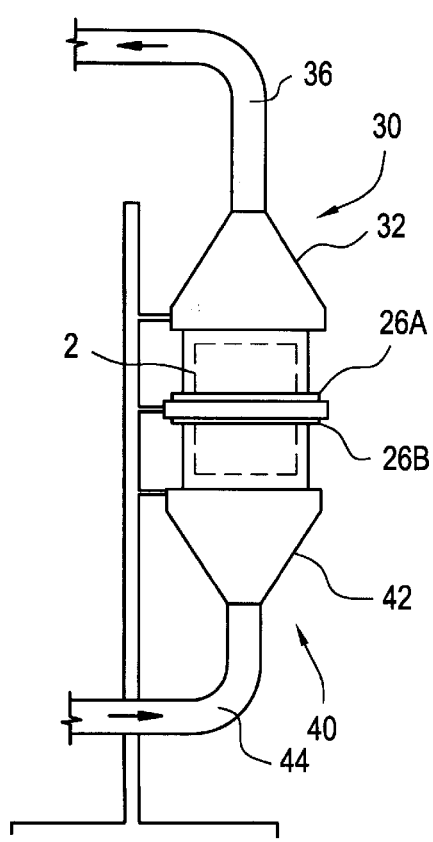
FIG. 2A is a side elevational view of a drying apparatus in the operative position for performing the method of the present invention.
Figure 2B:
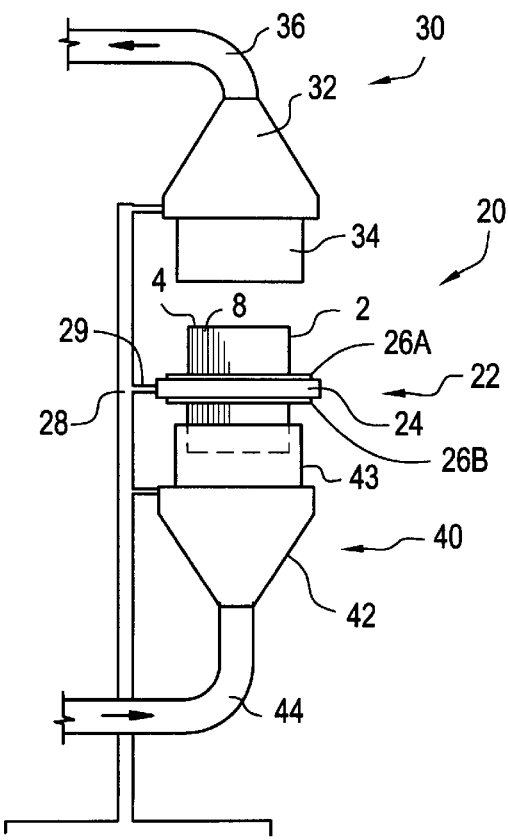
FIG. 2B is a side elevational view similar to FIG. 2A in which the coated and dried substrate is released from the drying apparatus.

Referring to FIGS. 2A and 2B, there is shown an embodiment of an apparatus for carrying out the present invention.

FIG. 2A shows operative engagement of the vacuum apparatus for pulling vapors through the substrate and a blowing device for forcing a gas (e.g. heated air) through the substrate. FIG. 2B shows the position of the substrate both before and after the drying operation when the vacuum and blowing apparatus are not in operation.

Referring first to FIG. 2B, the drying apparatus 20 includes a central supporting assembly 22, for supporting the substrate 2 during the drying operation. The assembly 22 includes a supporting housing 24 with upper and lower sealing gaskets 26A and 26B. The housing 24 is secured to a support stand 28 through a clamp 29 or other similar connecting device. The housing 24 can support the substrate 2 in the position shown in FIG. 2B.

The substrate 2 has a top end 4 and a bottom end 6. The top end 4 is covered with a vacuum generating device 30 which constitutes a second part of the drying apparatus 20. Referring again to FIG. 2B the vacuum generating device 30 includes a hood 32 having an extension 34 which operatively engages the housing 24 to form a fluid tight seal with the upper gasket 26A of the central supporting assembly 22. The hood 32 is connected through a conduit 36 to a blower or similar device (not shown) which draws vapor in the direction of the arrow form the hood 32 through the conduit 36 where it is vented.

The drying apparatus 20 as includes a device 40 for forcing or pushing a gas into the channels of the substrate. More specifically, the device 40 includes a hood 42 similar to the hood 32 described above. An extension 44 is provided which operatively engages the housing 24 to form a fluid tight seal with the lower gasket 26A of the central supporting assembly 22. The hood 42 is connected through a conduit 44 to a fan (not shown) which forces hot gas (e.g. air) through the conduit 44 and into the bottom end 6 of the channels of the substrate 2.

The operation of the present invention will be explained in connection with FIG. 2A. Referring to FIG. 2A, the vacuum generating device 30 and the forced gas generating device 40 are secured about the substrate 2 so that the respective hoods 32 and 42 are sealed to the housing 24 through the respective gaskets 26A and 26B. The blower (not shown) is activated while a hot gas (e.g. hot air) is forced into the conduit 44. Vapors are drawn from the substrate 2 through the hood 32 and out the conduit 36, while hot air is forced upwardly through the conduit 36 into the hood 42 and up into the bottom end 6 of the substrate 2. As a consequence, the vapors generated within the channels of the substrate are drawn out of the channels through the vacuum generating device 30 as previously explained.

The intensity of the vacuum imposed during the drying step can vary depending upon the cross-sectional area of the channels, the composition of the coating media and the amount of the coating media applied to each channel. Generally, the intensity of the vacuum will be in the range of from about 5 to 15 in w.c. The device 30 for imposing the vacuum can be, for example, be a Paxton Blower.

The hot gas blowing system 30 can be in the form of a jet air kerosene heater having a heating capacity of for example, about 50,000 btu. In operation, once the substrate is removed from the reservoir of the coating media, the vacuum draws the vaporized constituents from the channels at an intensity from about 5 to 15 in w.c., typically from 24 to 40 seconds. The vacuum is maintained until the vapors are dissipated. During or after the imposition of the vacuum, the hot gas generating system can generate a hot gas (e.g. hot air) at a suitable temperature (e.g. from about 180° to 700° F., most typically from about 250 to 400° F.) to either hasten or complete drying of the substrate.

The coating media which can be employed to coat the substrate in accordance with the present invention can vary widely. Catalytic compositions containing precious metals or base metals can be used as well as adsorbent compositions containing pollutant-absorbing materials such as zeolites and the like.

Pollutant-treating compositions that can be applied to the substrate in accordance with the present invention can vary widely and include aqueous systems and non-aqueous systems such as paints, lacquers and the like. The present invention has particular applicability to compositions containing a catalyst and/or adsorbent for coating substrates for the formation of pollution treating devices in the form of monoliths.

Catalysts which may be included in the composition can vary widely but generally include platinum group metals, base metals, alkaline earth metals, rare earth metals, and early transition metals. The platinum group metals include platinum, palladium, iridium, and rhodium.

The base metals include manganese, copper, nickel, cobalt, silver and gold. The alkaline earth metals include beryllium, magnesium, calcium, strontium, barium, and radium.

The rare earth metals include cesium, praseodymium, neodymium, promethium, samarium, europium, gadolinium, terbium, dysprosium, holmium, erbium, thulium, ytterbium, and lutetium.

Early transistation metals include scandium, yttrium, lanthanum, titanium, zirconium and hafnium.

Examples of such catalyst systems are disclosed in U.S. Pat. No. 5,139,992, U.S. Pat. No. 5,128,306, U.S. Pat. No. 5,057,483, U.S. Pat. No. 5,024,981, U.S. Pat. No. 5,254,519, and U.S. Pat. No. 5,212,142, each of which is incorporated herein by reference.

Adsorbent compositions are those with absorb hydrocarbons, carbon monoxide, ozone, nitrogen oxides or other pollutants commonly associated with pollutant-containing gases including automotive exhaust or ambient air. Such adsorbent materials are compositions which can include alkaline earth metal oxides, activated carbon, molecular sieves, especially zeolites, such as beta-zeolite and combinations thereof. Examples of such adsorbent compositions are disclosed in U.S. Pat. Nos. 4,985,210, 5,051,244 and 5,125,231, each of which in incorporated herein by reference.

EXAMPLES 1–4

A monolithic ceramic substrate having a cell density of 400 cells per square inch was coated with a slurry of a coating media containing alumina slip coat with noble metals by imposing a vacuum on the substrate while the same was partially submerged in a vessel containing the coating media.

The substrate was removed from the vessel and a vacuum was applied by a device as shown in FIG. 2A and 2B in the following manner. The vacuum generating apparatus was operated to generate a vacuum of about 10 w.c. At the same, hot air having a temperature of 250° F. was forced into the substrate at the overall rate of about 1500 standard cubic feet per minute for about 40 seconds. The amount of water vapor removed from the substrate was determined and the results are shown in Table 1 as designated under Example 1A.

TABLE 1

| Example | Temperature | Vacuum on or off | % water removed |
| --- | --- | --- | --- |
| 1A | 250° F. | ON | 43% |
| COMP. 1B | 250° F. | OFF | 25% |
| 2A | 275° F. | ON | 51% |
| COMP. 2B | 275° F. | OFF | 28% |
| 3A | 300° F. | ON | 56% |
| COMP. 3B | 300° F. | OFF | 35% |
| 4A | 350° F. | ON | 67% |
| COMP. 4B | 350° F. | OFF | 37% |

Example 1A was repeated except that the vacuum generating apparatus was turned off so that only forced hot air was used to dry the substrate. This comparative example was designated as COMP. 1B.

Example 1A operating in accordance with the conditions of the present invention, showed dramatic improvement in the amount of water removed from the substrate (43% vs. 25%) as compared with the employment of just forced air (COMP. 1B).

Examples 2A–4A were conducted in a manner similar to Examples 1A and COMP 1B, respectively except that the experiments were conducted at higher temperatures (i.e. 275° F., 300° F. and 350° F. respectively). For example, Example 2A was conducted in accordance with the present invention while comparative Example 2B was conducted without the imposition of a vacuum. The results are shown in Table 1.

As shown in Table 1, when the drying process was conducted in accordance with the present invention, using both the vacuum generating apparatus and the hot forced gas system, significantly more water was removed at a given temperature than if hot forced gas was used alone to dry the substrate.

EXAMPLE 5

Two identically coated monolithic substrates of the type employed in Example 1 were uniformly coated with a platinum containing catalyst slurry. Each substrate was treated in the same manner as Examples 4A and 4B respectively (drying temperature set at 350° F.). The velocity of the forced hot air through the substrate over time was measured and the results are shown in Table 2.

TABLE 2

| TIME | EXAMPLE 5A | COMPARATIVE EXAMPLE 5B |
| --- | --- | --- |
| 10 seconds | 2.2 m/sec | 0.9 m/sec |
| 20 seconds | 2.5 m/sec | 1.4 m/sec |
| 30 seconds | 2.7 m/sec | 1.8 m/sec |
| 40 seconds | 2.8 m/sec | 2.2 mlsec |
| 50 seconds | 3.1 m/sec | 2.6 m/sec |
| 60 seconds | 3.4 m/sec | 3.0 m/sec |
| 70 seconds | 3.8 m/sec | 3.4 m/sec |
| 80 seconds | 4.1 m/sec | 3.7 m/sec |
| 90 seconds | 4.4 m/sec | 4.1 m/sec |
| 100 seconds | 4.7 m/sec | 4.4 m/sec |

The amount of slurry applied to the substrate as a result of the coating process was determined to be 721 grams which included 120 grams of water based on the composition of the coating media. The vacuum was applied along with the hot air stream for a total of 90 seconds. At various intervals, the amount of water vapor removed was measured and the results are shown in Table 2.

As shown in Table 2, the velocity of the forced hot air in accordance with the present invention significantly exceeded the velocity of the forced hot air when no vacuum was employed. This is indicative of the more rapid removal of volatile components from the channels of the substrate.

What is claimed:

1. A method of drying a monolithic substrate having a coating media within a plurality of channels comprising:

a) removing a first end of the coated monolithic substrate from a bath containing the coating media while the coating media is in a wet condition;

b) applying a vacuum to an opposed end of the coated monolithic substrate at an intensity and for a time sufficient to draw vapor out of said channels while forcing a gas stream through the substrate from the first end in the direction of said opposed end without substantially changing the coating profile within the channels.

2. The method of claim 1 wherein the gas stream is heated to an elevated temperature into the channels.

3. The method of claim 1 wherein the gas stream is heated air.

4. The method of claim 2 wherein the gas stream is heated to a temperature of from about 180 to 700° F.

5. The method of claim 1 wherein the intensity of the vacuum is from about 5 to 15 in w.c.

6. Apparatus for drying a monolithic substrate having a coating media within a plurality of channels comprising:

a) removing means for removing the coated monolithic substrate from a bath containing the coating media while the coating media is in a wet condition;

b) vacuum applying means operatively engaged to one end of the substrate for imposing a vacuum on the coated monolithic substrate; and c) forced gas stream means for delivering a gas stream into an opposed end of the substrate while the vacuum applying means is applying a vacuum to the substrate.

* * * * *